INVENTORS.
CLAUDE J. PASQUIER
JOHN C. GRAEBNER
BY
ATTORNEY 3,201,700
PHASE SHIFTING SYSTEM
Claude J. Pasquier, New York, N.Y., and John C. Graebner, Glen Rock, N.J., assignors to International Telephone and Telegraph Corporation, Nutley, N.J., a corporation of Maryland
Filed May 10, 1961, Ser. No. 109,159
7 Claims. (Cl. 328—55)

This invention relates to a system for shifting the phase of a signal and more particularly to means for shifting the phase of a signal in discrete increments at a desired rate.

In certain systems, such as loran, it is necessary to synchronize a master signal to a received signal of the same frequency. In the receiver and associated equipment, the phase of the master signal is shifted until it is equal in phase to the received signal. The phase shifting is accomplished generally by electromechanical means, such as a resolver. There are, however, certain limitations attached to electromechanical means, such as a motor driven resolver; the rate of phase shift is limited as is also the range of the speed of phase shifting, and in cases where there is a fast drift, the mechanical limitations of a resolver prevent a fast phase correction.

It is an object of this invention to provide a phase shifting system that is suitable for fast as well as slow drift of a signal.

It is another object to provide a phase shift system that will provide a continuous sequential phase shift to change the frequency of a signal very slightly.

In this invention, a sequential combination of in phase and quadrature components of a continuous wave produces phase rotation of a sine wave in 90 degree steps. Subsequent frequency division results in a controllable frequency shift of the resulting wave by discrete phase steps. A feature of this invention is that first and second phase differing modulating signals are derived from the output of a signal generator. A given signal which is to be phase shifted is separately modulated with the first and second modulating signals and the outputs of the modulating means are then combined to produce the given signal phase shifted at a rate that is proportional to the frequency of the output of the signal generator.

Another feature is that the signal generator is a relaxation oscillator and the pulse output thereof drives a binary circuit and frequency divider to produce two square wave modulating signals in quadrature relation. The given signal and one of the square wave modulating signals is fed to a first balanced modulator and the given signal with a phase shift of 90 degrees is fed to a second balanced modulator to which is also coupled the second modulating square wave signal. The outputs of the two modulators are then combined and the resulting signal is the given signal which has been phase shifted in discrete steps at a rate that is proportional to the frequency of the relaxation oscillator.

The above-mentioned and other features and objects of this invention will become more apparent by reference to the following description taken in conjunction with the accompanying drawings, in which.

Figure 1:
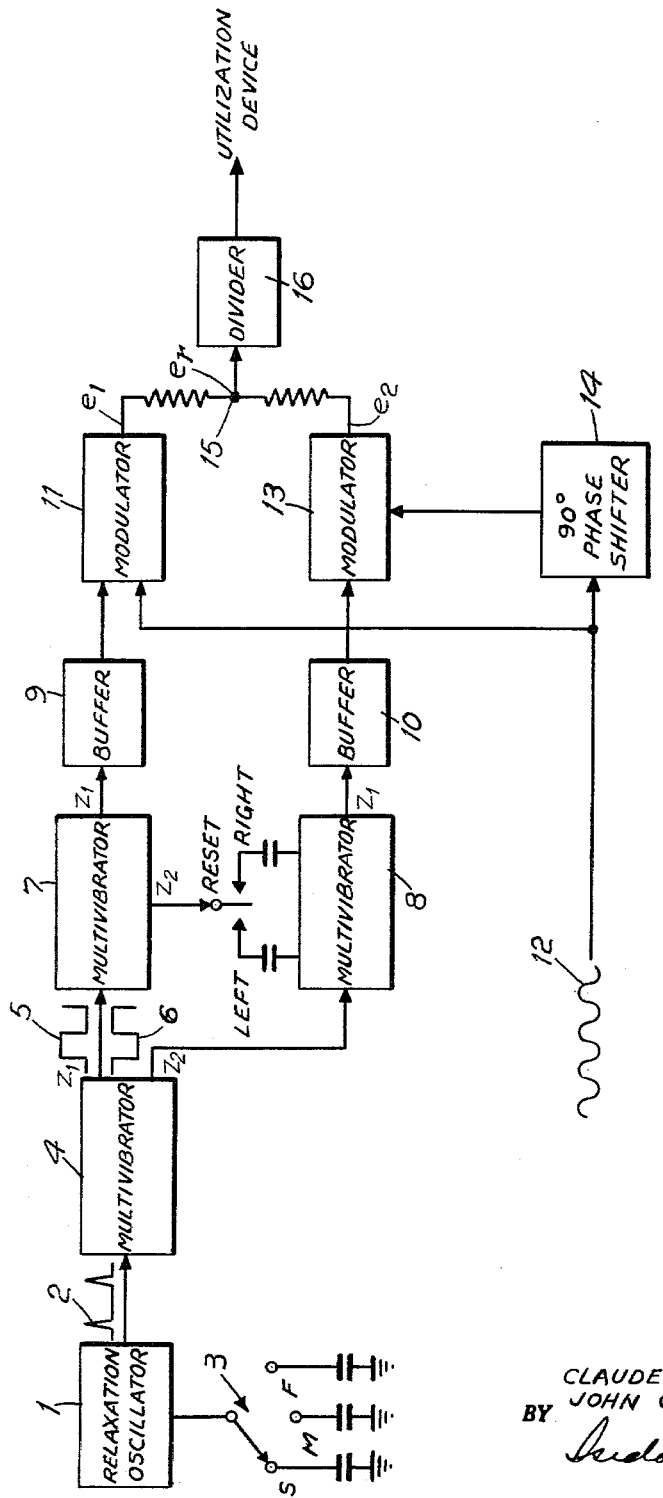
FIGURE 1 is a block diagram of the embodiment of this invention.

Referring now to FIGURE 1 which is the block diagram of the embodiment of this invention, there is shown a relaxation oscillator 1, the output of which are sharp pulses as shown at 2. The frequency of the oscillator as shown here can be varied in any conventional manner in three steps, as shown by the switch arrangement 3, having three positions, slow, medium and fast, denoted respectively by the letters S, M and F. The output of the relaxation oscillator 1 is fed to a bistable multivibrator 4 which has two outputs, one from each state, of square waves 5 and 6 which are 180 degrees out of phase with each other. The square wave output 5 is fed to a bistable multivibrator 7 and the square wave output 6 of the bistable multivibrator 4 is fed to a bistable multivibrator 8. Multivibrators 7 and 8 are turned on and off in response to the positive going edges of the square waves 5 and 6, respectively from multivibrator 4, or, alternatively, both in response to the negative going edges of square waves 5 and 6. A switching reset arrangement 9 capacitively couples the bistable multivibrator 7 to the bistable multivibrator 8. With respect to FIG. 1 there are shown outputs from multivibrator 4 $Z_1$ and $Z_2$ which are, respectively, square waves 5 and 6. The square wave outputs of multivibrator 7 are respectively $Z_1$ which is shown as waveform 2A and $Z_2$ which is 180° out of phase with $Z_1$ (multivibrator 7). The arrowhead at the end of the line labelled $Z_2$ from multivibrator 7 indicates that the $Z_2$ output is fed to the reset switch. As may be desired this $Z_2$ wave is coupled to the multivibrator 8 through either the left or right position of the reset switch. This switch reset arrangement permits the direction of the drift of the relaxation oscillator to proceed in a forward or backward direction, either advancing or retarding the rate of change of the phase shift as may be desired, or may be left in the neutral position between the left and right contacts of the reset switch when the desired phase relationship has been established. The output of the bistable multivibrator 7 is a square wave as shown in FIGURE 2A. The output of the bistable multivibrator 8 is also a square wave as shown in waveform 2B, which is offset from waveform 2A by 90 degrees. The outputs of the multivibrators 7 and 8 are coupled to impedance matching emitter followers 9 and 10. The output of the emitter follower 9 is coupled to balanced modulator 11 to which is also coupled a given continuous wave signal 12. The output of the emitter follower 10 is coupled to a balanced modulator 13 to which is coupled also the given signal 12 after it has been phase shifted 90 degrees in the phase shifter 14. The outputs of balanced modulators 11 and 13 are combined at 15 to form a single output which is the continuous wave signal 12 phase shifted by an amount determined by the quadrature relationships of multivibrators 7 and 8 and at a rate which is proportional to the frequency of the relaxation oscillator. The combined output is then coupled to a divider 16 to reduce the given continuous wave signal to a signal of the required frequency as may be desired.

The relaxation oscillator 1 generates frequencies that are four times the desired drift rate, or rate of phase shift as determined by the sweep speed selector 3. When the desired phase shift has been attained, the output of the relaxation oscillator 1 is stopped by means not shown but which are familiar to those skilled in the art. During the drift, the oscillator 1 output as shown is fed to the first multivibrator 4 which drives the multivibrators 7 and 8 in quadrature. That is, the driving multivibrator 7 is driven by the positive output from one transistor or tube, as the case may be, of the multivibrator 4 and the other driving multivibrator is driven by the positive output from the second tube or transistor of the first multivibrator. The square waves' outputs of the multivibrators 7 and 8, 2A and 2B, cause the output of each modulator 11 and 13 to shift 180 degrees at the low frequency rate of the relaxation oscillator. Adding the output of the two modulators will give a sine wave output that continuously shifts phase in 90 degree steps. To control the direction of drift, the driving multivibrators 7 and 8 must run in a particular quadrature relationship which is established by the reset connection switch 9. When the relaxation oscillator is stopped, the output of the modulator remains at the last established relationship. The frequency at which the outputs of modulators 11 and 13, $e_1$ and $e_2$, changes controls the drift rate. For example, for 600 microseconds/minute which is a slow drift, the phase of a 100 kilocycles sine wave signal has to be shifted 360 degrees a second or $e_1$ and $e_2$ are changed at one c.p.s. For a fast drift, $e_1$ and $_2$ are changed at 500 c.p.s. and for a medium drift, $e_1$ and $e_2$ are changed at 50 c.p.s.

Figure 2:
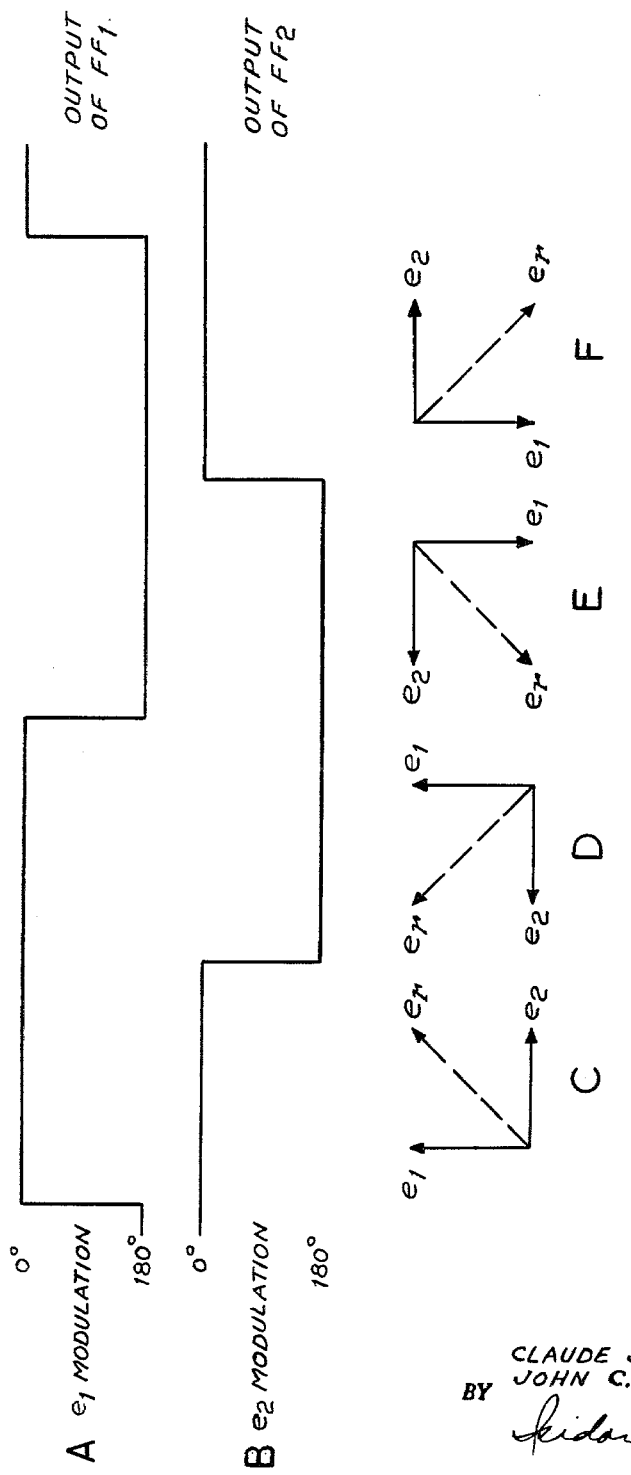
FIGURE 2 is a graph of waveforms useful in describing the operation of this invention together with a vectorial explanation of the phase shift of the signals.

The vectorial relationship that exists between the outputs of the modulators 11 and 13 and the summation of these outputs at 15 is shown in FIGURE 2 in relation to the modulating square waves 2A and 2B. As stated above, the phase of the continuous wave signal is changed at the desired drift rate by combining two quadrature continuous wave signals which are alternately shifted 180 degrees in phase with a resulting continuous wave signal that is continuously phase shifted in 90 degree steps. Initially, $e_1$ and $e_2$ are in a quadrature relation shown in FIGURE 2C. Then when $e_2$ is shifted 180 degrees the resultant, $e_r$, rotates instantaneously from 45 to 135 degrees, FIGURE 2D. Next, $e_1$ is shifted 180 degrees and $e_r$ moves from 135 degrees to 225 degrees, FIGURE 2E, and then when $e_2$ is shifted 180 degrees, $e_r$ moves from 225 degrees to 315 degrees, FIGURE 2F. Alternately, shifting $e_1$ and $e_2$ 180 degrees results in the output continuously shifting phase in 90 degree steps. Since $e_1$ and $e_2$ are not shifted together, the output never goes through zero.

In a reduction to practice of this system, the drift rates were set at 1 c.p.s., 50 c.p.s. and 500 c.p.s. The continuous wave signal was of the order of 100,000 c.p.s. By dividing down by ten the phase shifted continuous wave signal $e_r$ in the divider 16, the resultant was a 10 kc. signal with phase shift steps of 9 degrees. This process of dividing down can, of course, be continued so that the phase shift steps can be made as small as desired.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system to shift the phase of a signal in discrete increments comprising a relaxation oscillator, means to control the frequency output of said relaxation oscillator, a first bistable multivibrator, means coupling the output of said relaxation oscillator to said first bistable multivibrator to produce as the two outputs thereof square waves 180 degrees out of phase with each other, second and third bistable multivibrators, means connecting one output of said first multivibrator to said second multivibrator, means connecting the second output of said first multivibrator to said third multivibrator, the outputs of said second and third multivibrators being square waves wherein the square wave output of said second multivibrator is in quadrature relation to the square wave output of said third multivibrator, means to control the quadrature relation of the outputs from said second and third multivibrators, a source of sine wave signals, first and second modulators, means coupling the output of said second multivibrator and said sine wave signals to said first modulator, means coupling the output of said third multivibrator and said sine wave signals phase shifted 90 degrees to said second modulator, and means to combine the outputs of said first and second modulators, said combined output being the original sine wave signal phase shifted to discrete steps of 90 degrees, the rate of said phase shift being proportional to the frequency of the output of said relaxation oscillator and in a direction dependent upon said quadrature relation of the square wave outputs of said second and third multivibrators.

2. A system to shift the phase of a signal comprising a signal generator, means to derive first and second phase different modulating signals from the output of said signal generator, a given signal, means to modulate separately said given signal with said first and second modulating signals and means to combine the outputs of said modulating means to produce said given signal phase shifted at a rate that is proportional to the frequency of the output of said signal generator.

3. A system to shift the phase of a signal comprising a source of pulse signals, means to generate from said pulse signals a first modulating signal and a second modulating signal differing in phase from said first modulating signal, a continuous wave signal, means to modulate separately said continuous wave signal with said first and second modulating signals and means to combine the outputs of said modulating means to produce said continuous wave signal phase shifted at a rate that is proportional to the frequency of said pulse signals.

4. A system to shift the phase of a signal in discrete increments comprising a source of pulse signals, means to generate from said pulse signals a first modulating square wave signal and a second modulating square wave signal that is in quadrature relation to said first modulating signal, a continuous wave signal, means to modulate separately said continuous wave signal with said first and second modulating signals, and means to combine the outputs of said modulating means to produce said continuous wave signal phase shifted at a rate that is proportional to the frequency of said pulse signals.

5. A system to shift the phase of a signal in discrete increments comprising a relaxation oscillator, means to produce from the output of said relaxation oscillator two square waves 180 degrees out of phase with each other, first and second bistable multivibrators, means connecting one square wave to said first multivibrator, means connecting the second square wave to said second multivibrator, the outputs of said first and second multivibrators being square waves wherein the square wave output of said first multivibrator is in quadrature relation to the square wave output of said second multivibrator, a source of sine wave signals, first and second modulators, means coupling the output of said first multivibrator and said sine wave signals to said first modulator, means coupling the output of said second multivibrator and said sine wave signals phase shifted 90 degrees to said second modulator, and means to combine the outputs of said first and second modulators, said combined output being the original sine wave signal phase shifted in discrete steps of 90 degrees, the rate of said phase shift being proportional to the frequency output of said relaxation oscillator.

6. A system to shift the phase of a signal in discrete increments comprising a relaxation oscillator, means to control the frequency output of said relaxation oscillator, means to produce from the output of said relaxation oscillator two square waves 180 degrees out of phase with each other, first and second bistable multivibrators, means connecting one square wave to said first multivibrator, means connecting the second square wave to said second multivibrator, the outputs of said first and second multivibrators being square waves wherein the square wave output of said first multivibrator is in quadrature relation to the square wave output of said second multivibrator, a source of sine wave signals, first and second modulators, means coupling the output of said first multivibrator and said sine wave signals to said first modulator, means coupling the output of said second multivibrator and said sine wave signals phase shifted 90 degrees to said second modulator, and means to combine the outputs of said first and second modulators, said combined output being the original sine wave signal phase shifted in discrete steps of 90 degrees, the rate of said phase shift being proportional to the frequency output of said relaxation oscillator.

7. A system to shift the phase of a signal in discrete increments comprising a relaxation oscillator, means to control the frequency output of said relaxation oscillator, a first bistable multivibrator, means coupling the output of said relaxation oscillator to said first bistable multivibrator to produce as the two outputs thereof square waves 180 degrees out of phase with each other, second and third bistable multivibrators, means connecting one output of said first multivibrator to said second multivibrator, means connecting the second output of said first multivibrator to said third multivibrator, the outputs of said second and third multivibrators being square waves wherein the square wave output of said second multivibrator is in quadrature relation to the square wave output of said third multivibrator, a source of sine wave signals, first and second modulators, means coupling the output of said second multivibrator and said sine wave signals to said first modulator, means coupling the output of said third multivibrator and said sine wave signals phase shifted 90 degrees to said second modulator, and means to combine the outputs of said first and second modulators, said combined output being the original sine wave signal phase shifted in discrete steps of 90 degrees, the rate of said phase shift being proportional to the frequency of the output of said relaxation oscillator.

References Cited by the Examiner
UNITED STATES PATENTS

| | | | |
|---|---|---|---|
| 2,635,226 | 4/53 | Harris | 328—155 X |
| 2,668,238 | 2/54 | Frink | 328—155 X |
| 2,697,816 | 12/54 | Weaver | 332—45 |
| 3,027,523 | 3/62 | Wilcox | 328—24 X |

ARTHUR GAUSS, *Primary Examiner.*
HERMANN KARL SAALBACH, *Examiner.*